US008582465B2

(12) United States Patent
Ramalho

(10) Patent No.: US 8,582,465 B2
(45) Date of Patent: Nov. 12, 2013

(54) SYSTEM AND METHOD FOR FACILITATING NETWORK PERFORMANCE ANALYSIS

(75) Inventor: Michael A. Ramalho, Sarasota, FL (US)

(73) Assignee: Cisco Technology, Inc., San Jose, CA (US)

(*) Notice: Subject to any disclaimer, the term of this patent is extended or adjusted under 35 U.S.C. 154(b) by 106 days.

(21) Appl. No.: 13/219,868

(22) Filed: Aug. 29, 2011

(65) Prior Publication Data
US 2011/0310764 A1 Dec. 22, 2011

Related U.S. Application Data

(63) Continuation of application No. 11/284,463, filed on Nov. 21, 2005, now Pat. No. 8,018,917.

(51) Int. Cl.
*H04J 1/16* (2006.01)

(52) U.S. Cl.
USPC ............ 370/252; 370/248; 370/349; 370/352

(58) Field of Classification Search
USPC .......................... 370/235, 252, 248, 352, 349
See application file for complete search history.

(56) References Cited

U.S. PATENT DOCUMENTS

| | | | |
|---|---|---|---|
| 6,741,569 B1 | 5/2004 | Clark | |
| 6,801,532 B1 | 10/2004 | Anandakumar et al. | |
| 7,085,230 B2 | 8/2006 | Hardy | |
| 7,099,281 B1 | 8/2006 | Conway | |
| 7,173,910 B2 | 2/2007 | Goodman | |
| 7,197,010 B1 | 3/2007 | Berstein et al. | |
| 7,280,487 B2 | 10/2007 | Goodman | |
| 7,295,549 B2 | 11/2007 | Pepin et al. | |
| 7,359,409 B2 | 4/2008 | Li | |
| 7,372,844 B2 * | 5/2008 | Lee | 370/349 |
| 7,379,466 B2 * | 5/2008 | Kavaler | 370/412 |
| 7,430,179 B2 | 9/2008 | Towns-von Stauber et al. | |
| 7,924,890 B2 * | 4/2011 | Konda | 370/526 |
| 8,005,071 B2 * | 8/2011 | Kim | 370/352 |
| 8,244,258 B2 * | 8/2012 | Hori | 455/445 |
| 2002/0003799 A1 * | 1/2002 | Tomita | 370/392 |
| 2002/0167936 A1 | 11/2002 | Goodman | |

(Continued)

OTHER PUBLICATIONS

Non-final Office Action mailed Nov. 13, 2008 in U.S. Appl. No. 11/284,463, 28 pages.

(Continued)

*Primary Examiner* — Ricky Ngo
*Assistant Examiner* — Dewanda Samuel
(74) *Attorney, Agent, or Firm* — Fish & Richardson P.C.

(57) ABSTRACT

A system for facilitating network performance analysis. In an illustrative embodiment, the system includes a first module capable of quantifying network performance associated with a first portion of the network and providing a signal in response thereto. A second module is capable of ascertaining performance degradations in a communications link traversing plural portions of the network that are attributable to the first portion based on the signal. In a more specific embodiment, the second module further includes a third module adapted to ascertain degradations in network performance associated with a second portion of the network based on the signal and based on a performance parameter associated with both the first portion and the second portion of the network. In this embodiment, the first portion includes a wireless portion, and the second portion includes a wired portion. The performance parameter incorporates a Frame Loss Vector (FLV) associated with a communications link that traverses the wireless and wired portions of the network.

24 Claims, 7 Drawing Sheets

(56) References Cited

U.S. PATENT DOCUMENTS

| | | |
|---|---|---|
| 2002/0193999 A1* | 12/2002 | Keane et al. .................. 704/270 |
| 2004/0057381 A1* | 3/2004 | Tseng et al. .................. 370/238 |
| 2004/0064760 A1 | 4/2004 | Hicks et al. |
| 2004/0117498 A1* | 6/2004 | Hashimoto et al. ........... 709/230 |
| 2004/0165570 A1 | 8/2004 | Lee |
| 2004/0193709 A1 | 9/2004 | Selvaggi et al. |
| 2005/0141493 A1 | 6/2005 | Hardy et al. |
| 2005/0166124 A1 | 7/2005 | Tsuchinaga et al. |
| 2006/0031469 A1* | 2/2006 | Clarke et al. .................. 709/224 |
| 2006/0067226 A1 | 3/2006 | Chandra et al. |
| 2006/0239271 A1 | 10/2006 | Khasnabish et al. |
| 2007/0133515 A1 | 6/2007 | Kumar et al. |

OTHER PUBLICATIONS

Non-final Office Action mailed Apr. 6, 2009 in U.S. Appl. No. 11/284,463, 32 pages.

Non-final Office Action mailed Nov. 6, 2009 in U.S. Appl. No. 11/284,463, 35 pages.

Final Office Action mailed May 13, 2010 in U.S. Appl. No. 11/284,463, 35 pages.

Non-final Office Action mailed Jan. 24, 2011 in U.S. Appl. No. 11/284,463, 11 pages.

Notice of Allowance mailed May 25, 2011 in U.S. Appl. No. 11/284,463, 12 pages.

* cited by examiner

SYSTEM AND METHOD FOR FACILITATING NETWORK PERFORMANCE ANALYSIS

CROSS-REFERENCE TO RELATED APPLICATIONS

This application is a continuation application of and claims priority to U.S. application Ser. No. 11/284,463, filed on Nov. 21, 2005, the contents of which are incorporated herein by reference.

BACKGROUND OF THE INVENTION

This invention is related in general to networks and more specifically to systems and methods for observing or measuring network performance or communications link quality.

Systems for observing communications link quality are employed in various demanding applications including power-control systems for cellular networks and problem-diagnosis systems for Voice Over Internet Protocol (VOIP) communications sessions. Such applications often demand accurate network-quality observation systems that facilitate determining where and when communications link quality has degraded.

Network-quality observation systems are particularly important in VOIP applications, where a given communication session may employ plural types of networks, including wireless and wired networks, each with different performance characteristics. An exemplary VOIP system includes a first endpoint and a second endpoint, such as a wireless VOIP phone and a wired VOIP phone, respectively. In this example, a wireless Access Point (AP) interfaces the wireless VOIP phone with the Internet. An Internet-based soft switch facilitates routing one or more calls between the first endpoint and the second endpoint over the Internet. Accordingly, a given telephone call may employ wireless and wired portions of a network between the VOIP endpoints.

In VOIP applications, the quality of a given phone call is often assigned a Mean Opinion Score-Listening Quality (MOS-lq). The MOS-lq score is affected by packet losses occurring over the communications link between the endpoints as reported by one or more of the endpoints. Unfortunately, conventional systems and methods for determining and handling MOS-lq scores do not adequately facilitate determining where degradation of the MOS-lq score occurs in the overall network.

DETAILED DESCRIPTION OF EMBODIMENTS OF THE INVENTION

One embodiment of the present invention implements a system for facilitating network performance analysis. The system includes a first module that quantifies network performance over a first portion of a network and provides a signal in response thereto. A second module employs the signal to ascertain performance degradations, which are attributable to the first portion, in a communications link traversing plural portions of the network. The system is particularly useful in packet-switched networks having a wired section and a wireless section via which communications are established. Use of the system enables network personnel to readily ascertain which portions of the network are responsible for degradations in network performance, thereby obviating the need to run diagnostics software on the entire network to isolate sources of performance degradation.

For clarity, various well-known components, such as power supplies, amplifiers, filters, communications ports, hubs, modems, gateways, firewalls, network cards, Internet Service Providers (ISPs), and so on, have been omitted from the figures. However, those skilled in the art with access to the present teachings will know which components to implement and how to implement them to meet the needs of a given application.

Figure 1:
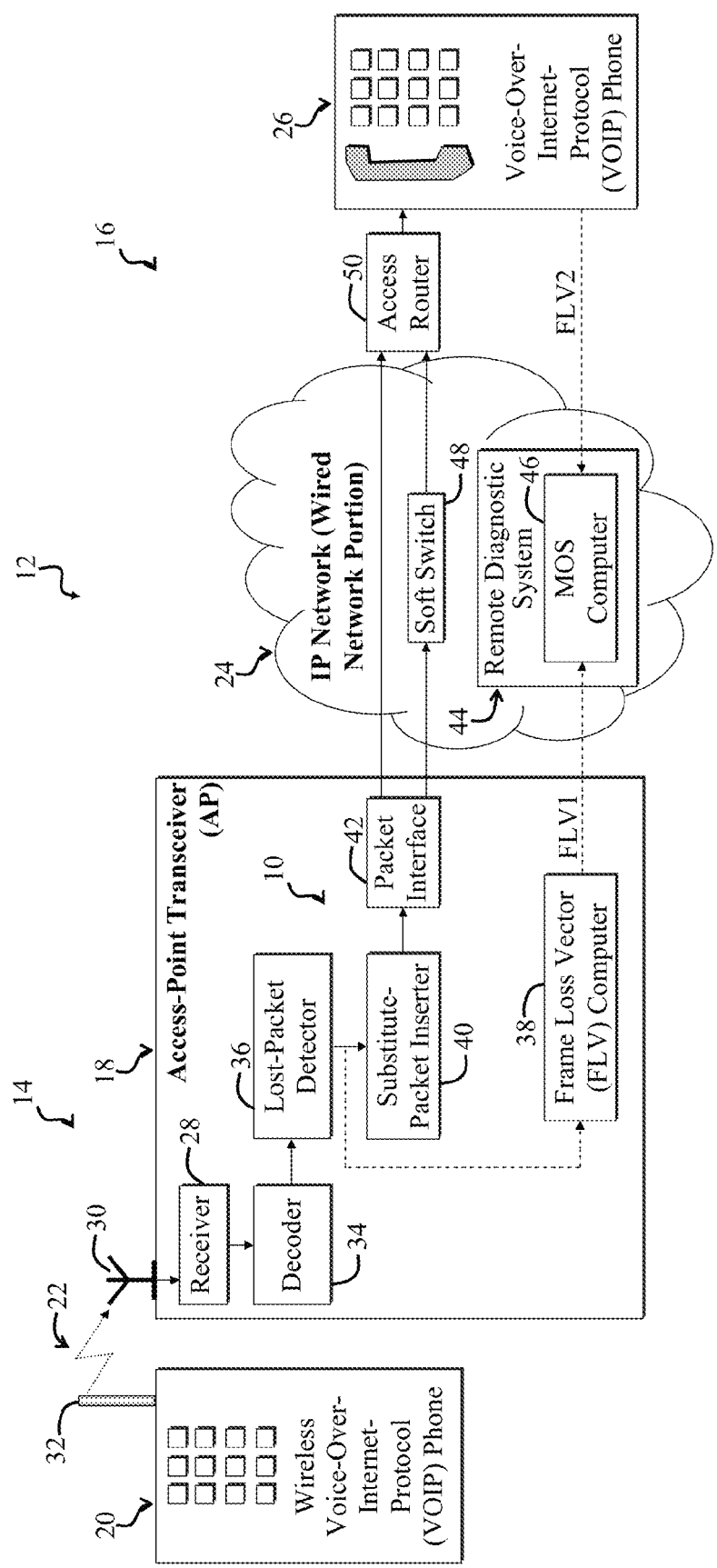
FIG. 1 is a diagram illustrating a system for determining communications link quality over different portions of a network according to a first embodiment of the present invention.

FIG. 1 is a diagram illustrating a system 10 for determining communications link quality over different portions 14, 16 of a network 12 according to a first embodiment of the present invention. The system 10 is implemented via the network 12. The network 12 includes a first wireless portion 14 and a second wired portion 16. The first portion 14 of the network 12 includes a wireless Access Point transceiver (AP) 18 in communication with a Voice-Over-Internet-Protocol (VOIP) phone 20 via a wireless communication link 22. The wired portion 16 of the network 12 includes an Internet Protocol (IP) network 24, such as the Internet, which is connected to a wired VOIP phone 26. The IP network 24 may be implemented via another type of packet-based or cell-based network without departing from the scope of the present invention.

In the present specific embodiment, the wireless AP 18 includes a receiver 28, which receives input from an AP antenna 30. The AP antenna 30 receives transmissions from the VOIP phone 20 via a VOIP-phone antenna 32. The wireless AP 18 further includes a decoder 34, a lost-packet detector 36, a Frame Loss Vector (FLV) computer 38, a substitute-packet inserter 40, and an packet interface 42.

The receiver 28 is connected to a decoder 34, which provides output to the lost packet detector 36 of the system 10. The system 10 further includes the substitute-packet inserter 40, which receives input from the lost-packet detector 36 and provides output to the packet interface 42. The AP packet interface 42 initially communicates with a VOIP soft switch 48, which communicates with the wired VOIP phone 26 via an access router 50 connecting the wired VOIP phone 26 with the IP network 24. The soft switch 48 helps to initialize communications between the VOIP phones 20, 26 to enable the VOIP phones 20, 26 to communicate by Real-time Transport Protocol (RTP) RTP media packets based on their respective IP addresses.

Subsequently, after initial communications between the devices 42, 50, 26 are established via the soft switch 48, the packet interface 42 communicates with the wired VOIP phone 26 directly through the access router 50 and the IP network 24, bypassing the soft switch 48. In certain embodiments, the soft switch 48 may be omitted. So-called media communications between the VOIP phones 20, 26 occur via RTP protocol packets, which typically bypass the soft switch 48.

The FLV computer 38 intercepts communications between the lost-packet detector 36 and the substitute-packet inserter 40. The system 10 further includes a remote diagnostic system 44 having a Mean-Opinion-Score (MOS) computer 46, which receives input from the FLV computer 38 and the wired VOIP phone 26.

In the present embodiment, the remote diagnostic system 44 is shown running on the IP network 24, however the remote diagnostic system 44 may be implemented elsewhere without departing from the scope of the present invention. For example, the remote diagnostic system 44 may be implemented in the wireless AP 18. Furthermore, the lost-packet detector 36, substitute-packet inserter 40, and FLV computer 38 of the system 10 may be implemented in locations other than the wireless AP 18 without departing from the scope of the present invention.

For illustrative purposes, the present specific embodiment illustrates a VOIP communications session established via the network 12. The communications session employs a communication link established between the wireless VOIP phone 20 and the wired VOIP phone 26. The communications link traverses the first wireless portion 14 of the network 12 and the second wired portion 16 of the network 12 and includes the wireless link 22 and one or more wired links through the IP network 24. In the present operative scenario, the communications link is discussed with respect to data flowing from the first VOIP phone 20 to the second wired VOIP phone 26.

In operation, after the communications link between the VOIP phones 20, 26 is established, a user of the wireless VOIP phone 20 speaks into the phone 20, which converts the speech signals into digital signals. The digital signals are then encoded and mixed as needed in preparation for transmission via the wireless link 22 to the wireless AP 18 according to Institute of Electrical and Electronics Engineers (IEEE) 802.11 standards. Other standards, such as IEEE 802.16, may be employed without departing from the scope of the present invention.

The antenna 30 of the wireless AP 18 forwards the received signal to the AP receiver 28, for signal amplification, mixing, and/or other operations. The receiver 28 forwards the received signal to the decoder 34, which converts the received signal into an Internet Protocol (IP) signal suitable for routing via the IP network 24.

In the present specific embodiment, the decoder 34 forwards the resulting IP signal to the lost-packet detector 36. The lost-packet detector 36 monitors the output of the decoder 34 and determines when packets are missing in the output of the decoder 34. IP packets at the output of the decoder 34 retain time stamps, such as RTP time stamps, which are assigned via the wireless VOIP phone 20 upon transmission.

Over the wireless link 22, packets seldom get reordered. Accordingly, the lost-packet detector 36 determines missing packets by observing skipped time stamps in a sequence of time stamps associated with a sequence of received packets. Packets associated with missing or skipped time stamps are considered lost packets.

In network sections wherein packets arrive at a destination out of sequence, packets may be collected, such as via a jitter buffer, for a predetermined time interval before the packets are ordered according to their associated time stamps. The signal delay introduced by the jitter buffer, which may be implemented in the lost-packet detector 36, compensates for packet latency. Packets arriving outside of the jitter buffer time interval are considered lost as discussed more fully below.

The output of the lost-packet detector 36 represents the data stream received from the wireless VOIP phone 20 and may contain additional information, such as sequential coding other than time stamps, specifying lost packets in the data stream. The substitute-packet inserter 40 replaces missing packets in the data stream with substitute packets and provides an adjusted signal in response thereto to the packet interface 42. The substitute packets are given the same time stamps as the missing packets. The payloads of the substitute packets may be empty or may contain concealment information to minimize degradations in perceived audio quality experienced by the user of the wired VOIP phone 26. Alternatively, concealment information may be added to the substitute packets at a different location in the network 12. In certain implementations, the lost-packet detector 36 and the substitute-packet inserter 40 are selectively enabled or disabled in response to a predetermined condition or signal, such as an enable signal received from the remote diagnostic system 44. When the modules 36, 40 are disabled, signaling from the decoder 34 passes through to the packet interface 42, bypassing the modules 36, 40.

The functions of the lost-packet detector 36 and the substitute-packet inserter 40 may be combined into a single module without departing from the scope of the present invention. Furthermore, the remote diagnostic system 44 may be implemented in another location, such as on the wired VOIP phone 26 without departing from the scope of the present invention. In addition, communications between the FLV computer 38 and the remote diagnostic system 44 and between the wired VOIP phone 26 and the remote diagnostic system 44 may be routed through the IP network 24 via the respective interfaces 42, 50 without departing from the scope of the present invention. Note that the packet interface 42 may include routing functionality in certain applications. The design and construction of suitable output interfaces are known in the art.

In the present specific embodiment, the FLV computer 38 computes a first FLV (FLV1) based on the data stream output from the lost-packet detector 36 before insertion of substitute packets by the substitute-packet inserter 40. FLV1 is forwarded to the MOS computer 46 of the remote diagnostic system 44 for further processing.

For the purposes of the present discussion, an FLV is a vector with values indicating received and lost packets or frames for a data stream. For example, in one embodiment, elements of FLV1 contain 1s representing received frames and 0s for lost frames. In a data stream with 10 millisecond frame sizes, 100 frames are received each second. Accordingly, an 8-second FLV contains 800 elements, which is suitable for computation of an MOS. Since VOIP packets often contain plural frames, each lost packet results in plural zeros in the FLV. Hence, computation of an MOS, such as an MOS-lq, is based on a Frame-Loss Vector (FLV), which indicates packets lost in a predetermined time frame corresponding to the length of the FLV.

When the wired VOIP phone 26 receives the VOIP signal from the wireless VOIP phone 20, software and/or hardware running on the wired VOIP phone 26 assembles the corresponding received packets, including the substitute packets inserted by the substitute-packet inserter 40, and generates a corresponding FLV (FLV2). The assembled packets are then forwarded to a phone speaker system (not shown) for conversion to acoustic signals. FLV2 is forwarded to the MOS computer 46.

FLV1 and FLV2 are employed by the MOS computer 46 to compute MOS values associated with the communications link from the wireless VOIP phone 20 to the wired VOIP phone 26. In particular, due to insertion of substitute packets by the inserter 40, FLV2 provides an indication of communications link quality attributable to the wired portion 16 of the network 12 between the wireless AP 18 and the wired VOIP phone 26. FLV1 provides an indication of communications link quality attributable to the wireless link 22. The MOS computer 46 may combine FLV1 and FLV2 to compute a total MOS score associated with the entire communications link over the wireless portion 14 and the wired portion 16 of the network 12. Forwarding of FLV1 from the FLV computer 38 and FLV2 from the wired VOIP phone 26 may occur automatically or in response to a queries sent from the remote diagnostic system 44 to the respective devices 38, 26.

Alternatively, the FLV computer 38 is omitted from the access point 18, and FLV1 is not computed at the access point 18. In this implementation, software running on the wired VOIP phone 26 computes both FLV1 and FLV2 and then selectively forwards them to the remote diagnostic system 44. The software running on the wired VOIP phone 26 analyzes incoming packets to determine if substitute packets are present. The software detects substitute packets in the incoming data stream and treats the detected substitute packets as missing packets for the purposes of computing FLV1. Actual missing packets detected by the wired IP phone 26 in the incoming data stream are assumed to have been lost over the wired portion 16 of the network 12, and consequently, they are treated as not missing for the purposes of computing FLV1. Similarly, in this implementation, the software running on the wired VOIP phone 26 treats substitute packets as not missing and treats actual missing packets as missing for the purposes of computing FLV2. Alternatively, some or all of the functionality of the remote diagnostic system 44 is implemented via one of the VOIP phones 20, 26, preferably the wired VOIP phone 26 in the present operative scenario.

Conventionally, MOS scores are based on the entire communications link between the VOIP phones 20, 26. Consequently, when communications link quality degraded beyond a certain level, network diagnostics were run on the entire network 12, which was often expensive and time consuming. Networks employing embodiments of the present invention can now readily determine whether network quality degradations resulted from the wireless portion 14 of the network 12 or the wired portion 16 of the network 12, thereby obviating the need to run extensive network diagnostics on the entire network 12. Furthermore, when users complain of quality degradations, instances wherein such degradations are due to the wireless link 22 may be readily determined and cited as the reason for the quality degradation. Accordingly, VOIP providers can guarantee certain quality levels based on the wired portion 16 of the network 12, where effective Quality Of Service (QOS) are readily deployable, without concern that degradations in the quality of the wireless link 22 will conflict with the quality guarantee.

Figure 2:
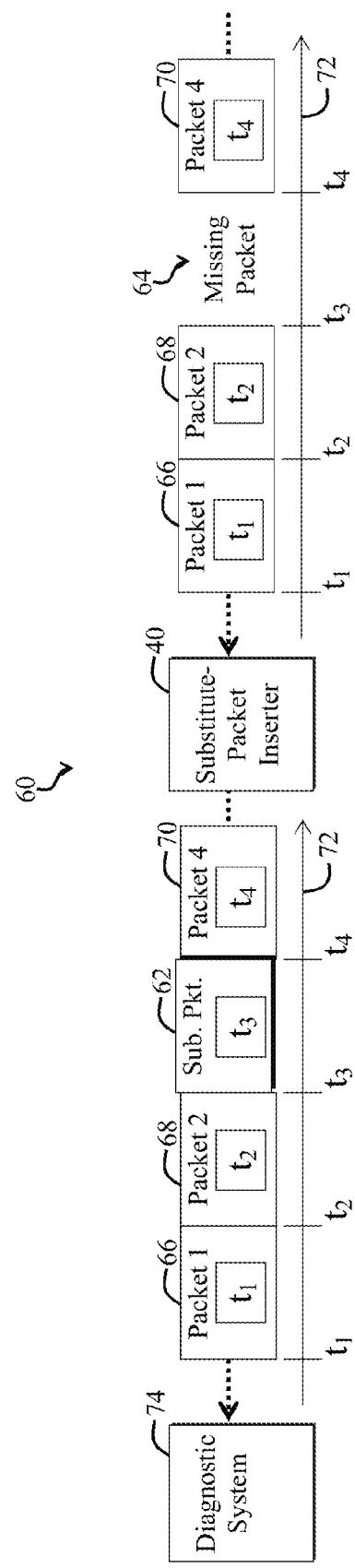
FIG. 2 is a diagram illustrating insertion of a substitute packet in place of a missing or lost packet in an exemplary packet stream.

FIG. 2 is a diagram illustrating insertion of a substitute packet 62 in place of a missing or lost packet 64 in an exemplary packet stream 60. The exemplary IP signal stream 60 includes a first packet 66 with a first time stamp ($t_1$), a second packet 68 with a second time stamp ($t_2$), and a fourth packet 70 with a fourth time stamp ($t_4$). The third packet represents the missing packet 64 and is associated with a third time stamp ($t_3$). An exemplary time axis 72 shows when packets are expected to be received by the substitute-packet inserter 40 or other device.

The substitute-packet inserter 40 inserts the substitute packet 62 in the IP signal stream 60, yielding an adjusted stream. The adjusted IP signal is employed to compute an FLV (FLV2) based on the wired portion of a network, such as the wired portion 16 of the network 12. Computation of the FLV may be performed directly by a diagnostic system 74, which may run on the wired VOIP phone 26 of FIG. 1 or elsewhere in the network 12. Alternatively, the remote diagnostic system 44 of FIG. 1 may be positioned to intercept packets output from the access router 50 and destined to the wired VOIP phone 26 to thereby infer FLV2 and compute a corresponding MOS score.

Figure 3:
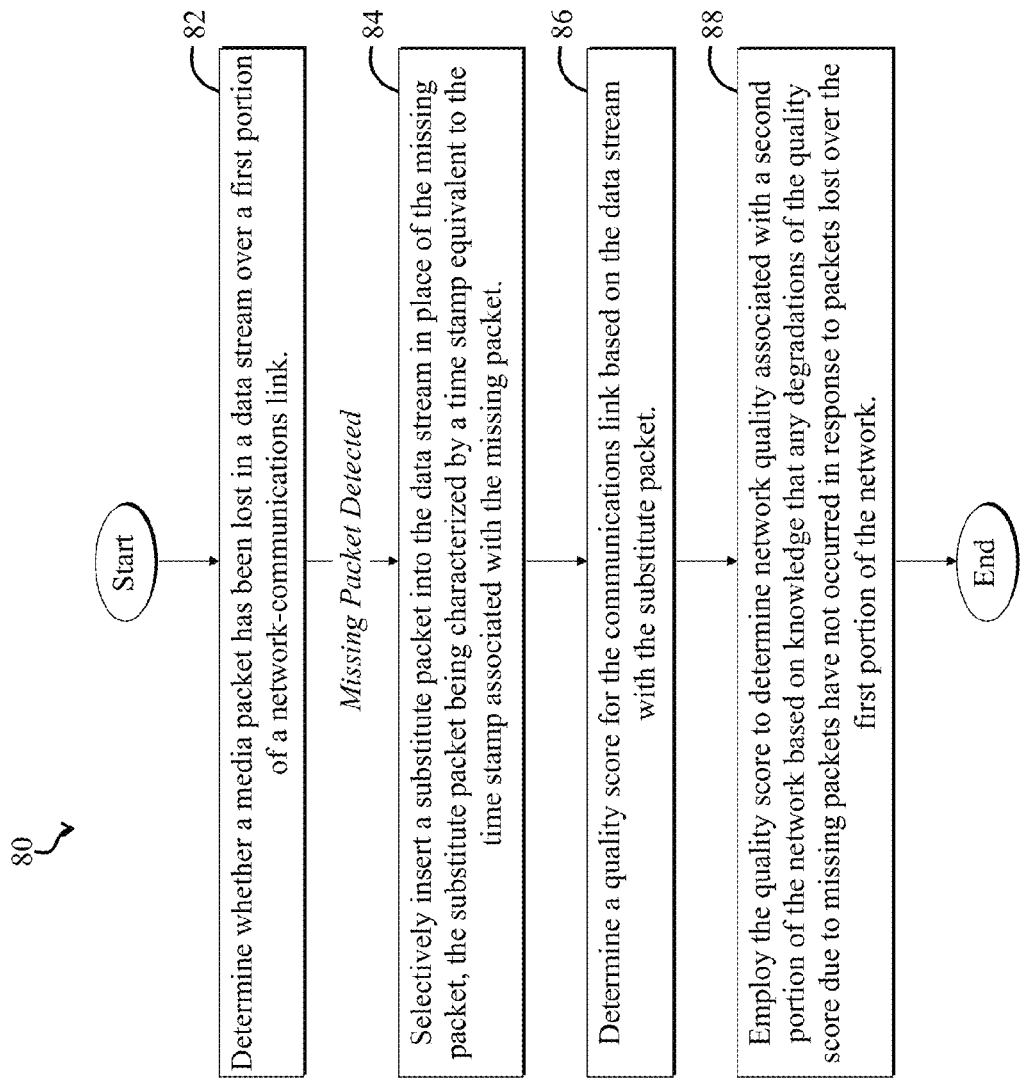
FIG. 3 is a flow diagram of a method adapted for use with the system of FIG. 1.

FIG. 3 is a flow diagram of a method 80 adapted for use with the system 10 of FIG. 1. With reference to FIGS. 1 and 3, the method 80 includes an initial lost-packet step 82, wherein the lost-packet detector 36 determines whether a media packet has been lost in a data stream over the first portion 14 of the network 12, which corresponds to the wireless link 22.

In a subsequent packet-insertion step 84, missing packets in the data stream are replaced with substitute packets. The time stamps of the substitute packets are equivalent to the time stamps of the lost packets.

Subsequently, a scoring step 86 involves computing a quality score for the communications link between the VOIP phones 20, 26 based on the data stream with the substitute packet. This quality score is based on FLV2 forwarded from the wired VOIP phone 26 to the MOS computer 46 running on the diagnostic system 44.

In a subsequent inferring step 88, the quality score associated with FLV2 is employed to ascertain network quality associated with the portion of the communications link traversing the wired portion 16 of the network 12. Due to the insertion of substitute packets in the packet-insertion step 84, packets lost over the wireless link 22 will not affect FLV2 and the associated MOS score.

Figure 4:
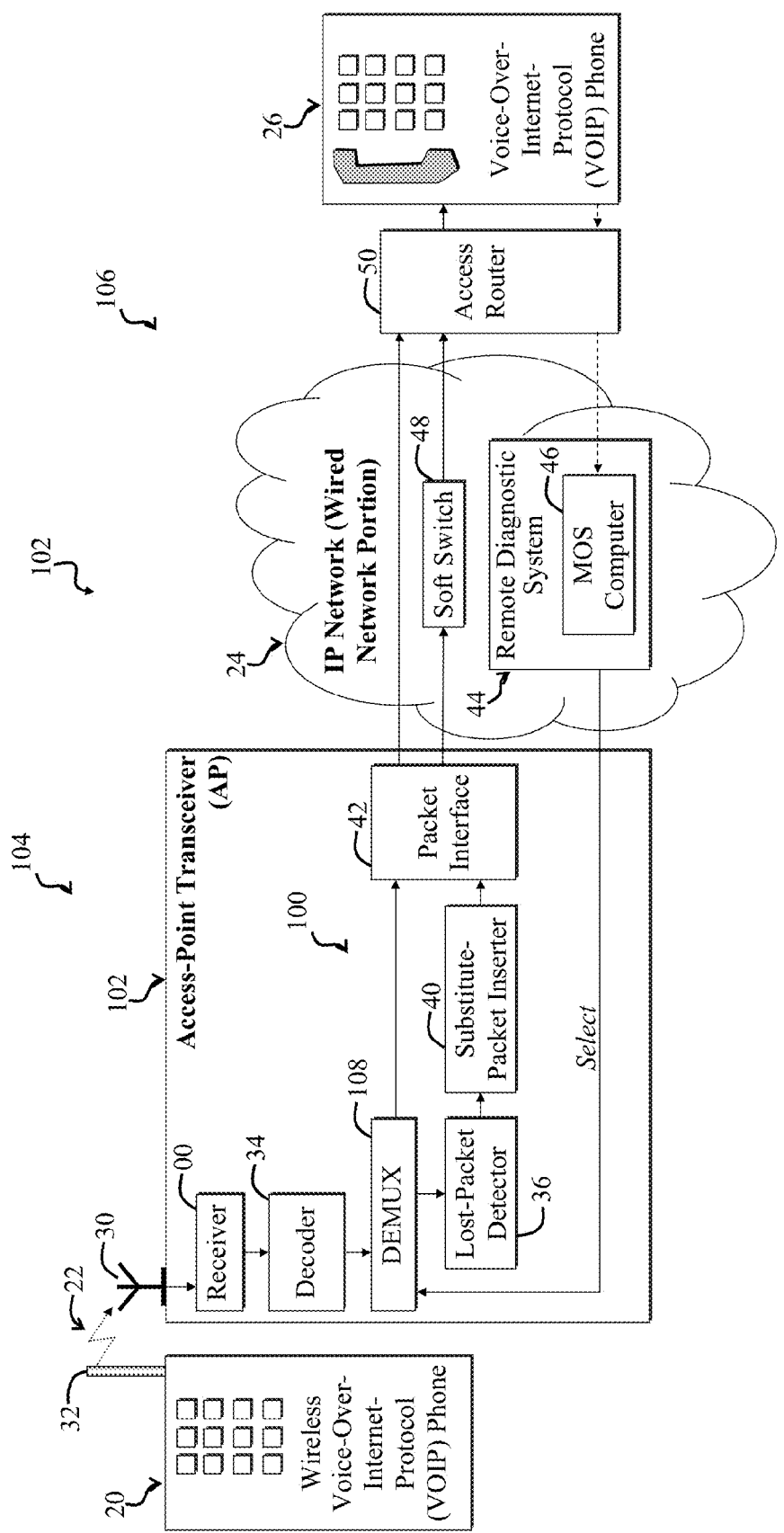
FIG. 4 is a diagram illustrating a system for determining network communications link quality over different portions of a network according to a preferred embodiment of the present invention.

FIG. 4 is a diagram illustrating a system 100 for determining network communications link quality over different portions 104, 106 of a network 102 according to a preferred embodiment of the present invention.

The construction of the network 102 is similar to the construction of the network 12 of FIG. 1 with the exception that the wireless AP 18 of FIG. 1 is replaced with an AP 102 lacking the FLV computer 38 and having a demultiplexer (DEMUX) 108 inserted between the decoder 34, the lost packet-detector 36, and between the decoder 34 and the packet interface 42 of FIG. 1. The DEMUX 108 receives a select signal from the remote diagnostic system 44 to selectively switch the output of the decoder 34 between the packet interface 42 and the lost-packet detector 36 to switch the system 100 between a standard operational mode and a packet-concealment mode, respectively.

In packet-concealment mode, the system 100 and associated network 102 operate similarly to the system 10 and network 12 of FIG. 1 with the exception that FLV1 is not computed at the AP 102 and forwarded to the remote diagnostic system 44. In particular, FLV2 is computed by the wired VOIP phone 26. In this mode, FLV2 represents network or link quality attributable to the wired portion 106 of the network 102.

In standard mode, the select signal from the remote diagnostic system 44 causes the output of the decoder 34 to be routed directly to the packet interface 42 without passing through the lost-packet detector 36 and the substitute-packet inserter 40. The resulting FLV (FLV3) computed by the wired VOIP phone 26 represents the FLV associated with the total link between the VOIP phones 20, 26. The remote diagnostic system 44 may selectively combine FLV2 and FLV3 to infer packet-loss rates over the wireless link 22 associated with the first portion 104 of the network 102.

In a related preferred implementation, some or all of the functionality of the remote diagnostic system 44 is implemented in a VOIP phone, such as the VOIP phone 26. For example, in one implementation, the VOIP phone 26 computes FLVs and MOS scores, and the remote diagnostic system 44 selectively enables the DEMUX 108 when the MOS scores reported to the remote diagnostic system 44 by the VOIP phone 26 reach a predetermined value or value range.

Figure 5:
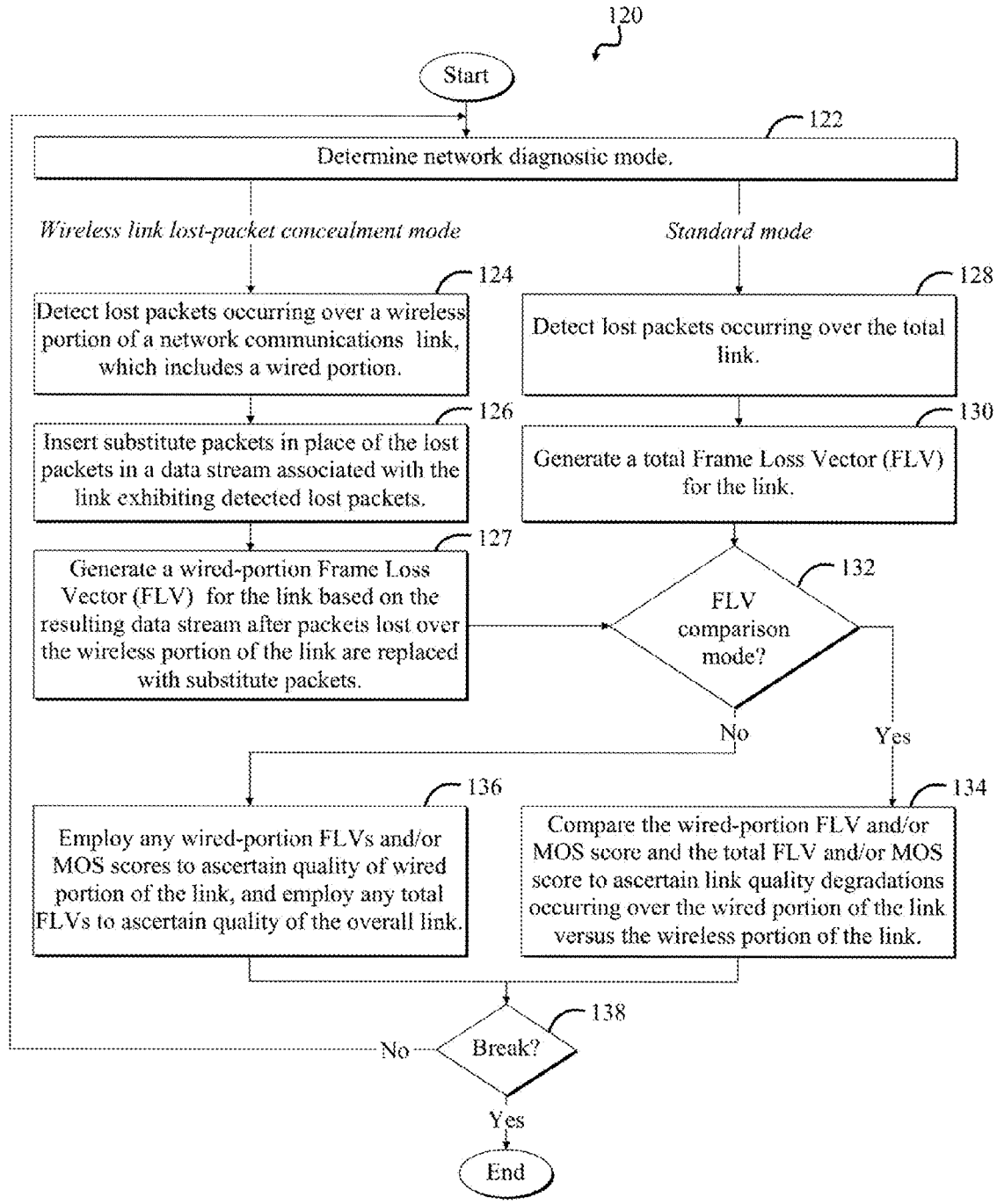
FIG. 5 is a flow diagram of a method adapted for use with the system of FIG. 4.

FIG. 5 is a flow diagram of a method 120 adapted for use with the system 100 of FIG. 4. With reference to FIGS. 4 and 5, the method 120 includes an initial mode-determining step 122, wherein the mode of the system 100 is determined via diagnostic software and/or hardware running on the remote diagnostic system 44.

If the remote diagnostic system 44 selects packet-concealment mode, then lost packets occurring over the wireless link 22 are detected in a first lost-packet-detection step 124.

In a subsequent packet-insertion step 126, the substitute-packet inserter 40 inserts substitute packets into the data stream before the data stream is forwarded through the IP network 24 to the wired VOIP phone 26.

Subsequently, in a first FLV step 127, FLV2 is computed by the wired VOIP phone 26 based on the data stream arriving at the wired VOIP phone 26 after traversing the network 102 and after insertion of substitute packets via the substitute-packet inserter 40.

If the network diagnostic mode is standard mode as determined in the initial mode-determining step 122, then a second lost-packet-detection step 128 is performed. In the second lost-packet-detection step 128, the DEMUX select signal from the remote diagnostic system 44 to the DEMUX 108 causes the DEMUX to divert the output of the decoder 34 to the packet interface 42, thereby effectively bypassing the lost-packet detector 36 and the substitute-packet inserter 40.

Consequently, the resulting total FLV (FLV3) computed by the wired VOIP phone 26 and forwarded to the MOS computer 46 in a subsequent second FLV step 130 reflects the communications link quality associated with the entire network 102 between the VOIP phones 20, 26, including the first portion of the network 104 associated with the wireless link 22.

After obtaining FLVs in the first FLV step 127 and/or the second FLV step 130, a second mode-checking step 132 is performed. The second mode-checking step determines whether or not the remote diagnostic system 44 is operating in comparison mode. If the remote diagnostic system 44 is operating in comparison mode, then a comparison-analysis step 134 is performed next. Otherwise, a section-analysis step 136 is performed next.

In the comparison-analysis step 134, the remote diagnostic system 44 runs one or more software and/or hardware routines to compare the wired portion FLV (FLV2) and/or associated MOS score with the total FLV (FLV3) and/or associated MOS score to ascertain the contribution of lost packets occurring over the wireless link 22 to the link quality between the VOIP phones 20, 26.

In the section-analysis step 136, the remote diagnostic system 44 runs one or more software and/or hardware routines to ascertain the quality of the wired portion of the link between the VOIP phones 20, 26 based on FLV2. FLV3 is employed to ascertain link quality of the overall link between the VOIP phones 20, 26.

In a subsequent break-checking step 138, the method 120 determines if a system-break is detected. If a system break is detected by the remote diagnostic system 44, the method 120 completes. A system break might occur in response to termination of the communications session between the VOIP phones 20, 26. If a system break is not detected in step 138, then the method 120 continues with the initial mode-checking step 122.

Figure 6:
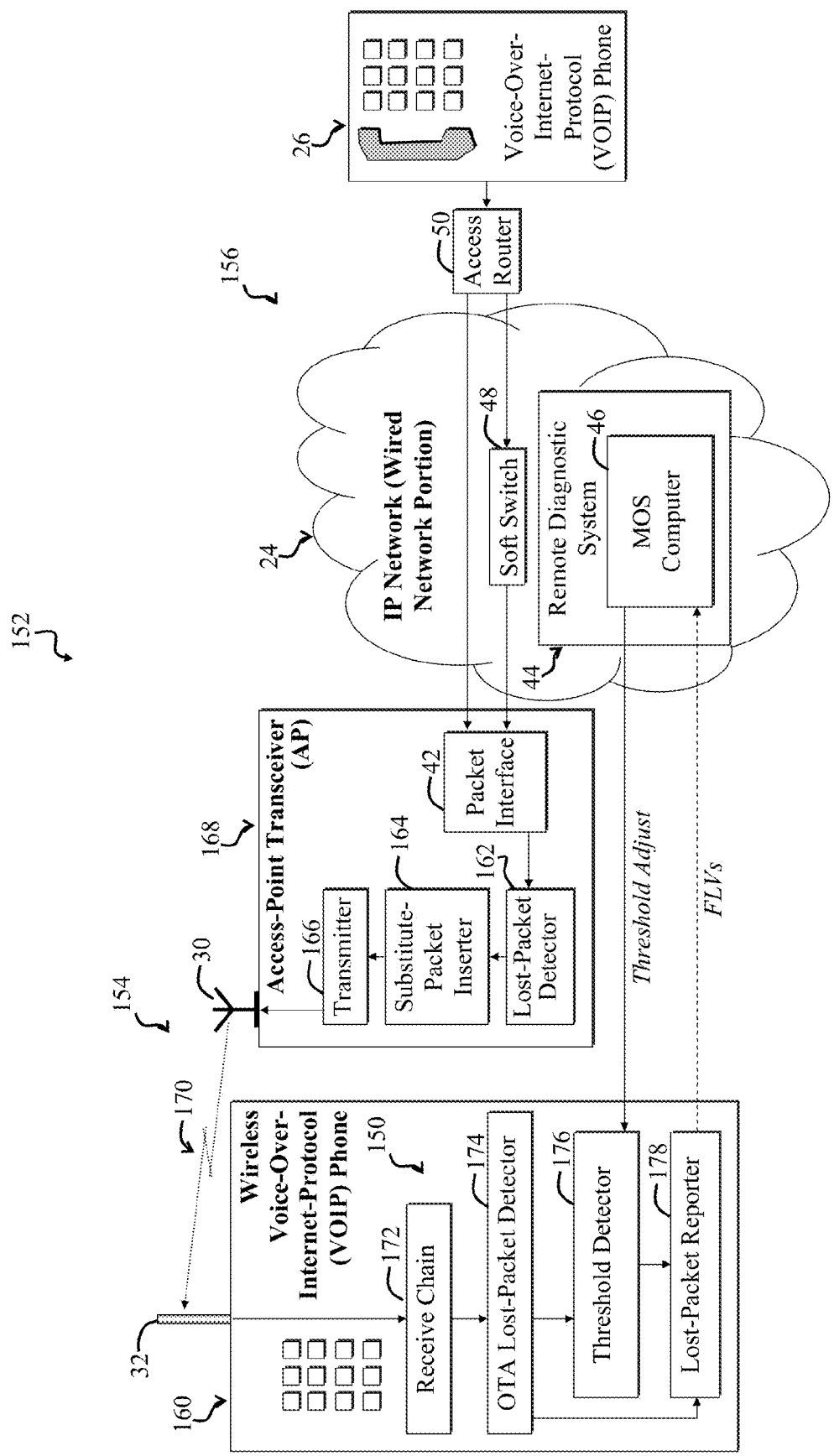
FIG. 6 is a diagram illustrating a system for determining network communications link quality over different portions of a network according to a third embodiment of the present invention.

FIG. 6 is a diagram illustrating a system 150 for determining network communications link quality over different portions of a network 152 according to a third embodiment of the present invention. The operative scenario illustrated in FIG. 6 is related to the operative scenarios of FIGS. 1 and 3 with the exception that the communications link in question occurs from the wired VOIP phone 26 to the wireless VOIP phone 20 instead of vice versa. Furthermore, reporting of FLVs and associated computation of MOS scores by the MOS computer 46 is selectively controlled based on link performance and with reference to an adjustable performance threshold as discussed more fully below. Alternatively, FLVs are reported periodically. The wireless VOIP phone 20 and AP 18 of FIG. 1 are replaced with a modified wireless VOIP phone 160 and AP 168, respectively, in FIG. 6.

Transmit portions of the AP 168 and the wireless VOIP phone 160 are illustrated in FIG. 6. The transmit section of the AP 168 includes the packet interface 42, which selectively forwards IP signals received from the wired VOIP phone 26 via the IP network 24 to a lost-packet detector 162, the output of which is connected to a transmitter 166. The lost-packet detector 162 provides input to a substitute-packet inserter 164. The lost-packet detector 162 and the substitute-packet inserter 164 of FIG. 6 are similar to the lost-packet detector 36 and the substitute-packet inserter 40 of FIG. 1, respectively. Functionality implemented via the substitute-packet inserter 164 and the lost-packet detector 162 may be selectively bypassed without departing from the scope of the present invention.

The lost-packet detector 162 monitors time stamps of received packets to identify missing packets. The substitute-packet inserter 164 selectively inserts substitute packets into the packet stream. The packet stream is then wirelessly transmitted via the transmitter 166 and antenna 30 to the wireless VOIP phone 160 via a wireless forward link 170 in accordance with 802.11 or 802.16 standards.

The wireless-phone antenna 32 communicates with a receive chain 172, which prepares the received signal for digital processing, such as processing performed by a subsequent Over The Air (OTA) lost-packet detector 174. The OTA lost-packet detector 174 identifies lost packets in the packet stream output by the receive chain 172. Lost packets identified by the OTA lost-packet detector 174 represent packets lost via the wireless forward link 170.

The OTA lost-packet detector 174 provides input to a threshold detector 176 and a lost-packet reporter 178. The threshold detector 176 maintains a threshold that is adjustable via input from the MOS computer 46 running on the remote diagnostic system 44. The threshold detector 176 provides output to the lost-packet reporter 178, which selectively provides FLVs to the MOS computer 46 in response to the crossing of a performance threshold as determined by the threshold detector 176.

The threshold detector 176 determines when the number of lost packets detected by the lost-packet detector 174 exceeds a predetermined adjustable threshold within a certain time interval and provides an enable signal in response thereto to the lost-packet reporter 178. The lost-packet reporter 178 computes FLVs and provides corresponding reports associated with incoming data. The lost-packet reporter 178 releases the FLVs and associated reports to the MOS computer 46 in response to a threshold-exceedance signal, i.e., enable from the threshold detector 176.

The lost-packet reporter 178 may report various types of FLVs to the MOS computer 46. For example, an FLV representative of packets lost over the wired portion 156 of the network 152 may be computed by the lost-packet reporter 178 by placing 1s in FLV elements corresponding to packets lost over the wireless link 170. Similarly, an FLV representative of packets lost over the wireless portion 154 of the network 15 may be computed by inserting 1s in FLV elements corresponding to packets lost over the wired link 156, which correspond to substitute packets inserted by the substitute-packet inserter 164 or to packets associated with missing original time stamps. In this case, 0s are inserted in FLV elements corresponding to packets lost over the wireless link 170. Other types of FLVs may be computed by the lost-packet reporter 178 and selectively forwarded to the MOS computer 46 without departing from the scope of the present invention. For example, an FLV representative of the entire link from the wired VOIP phone 26 to the wireless VOIP phone 160 may be computed by the lost-packet reporter 178 and then selectively forwarded to the MOS computer 46 in response to the passing of a performance threshold as determined by the detector 176.

The adjustable threshold implemented by the threshold detector 176 may be another type of threshold without departing from the scope of the present invention. For example, rather than being based solely on packets lost over the wireless link 170, the threshold employed by the detector 176 may be based on the overall link degradation based on the FLV associated with the entire link from the wired VOIP phone 26 to the wireless VOIP phone 160.

Those skilled in the art with access to the present teachings may readily construct or purchase the modules disclosed in FIGS. 1, 3, and 6 to implement an embodiment of the present invention without undue experimentation.

Figure 7:
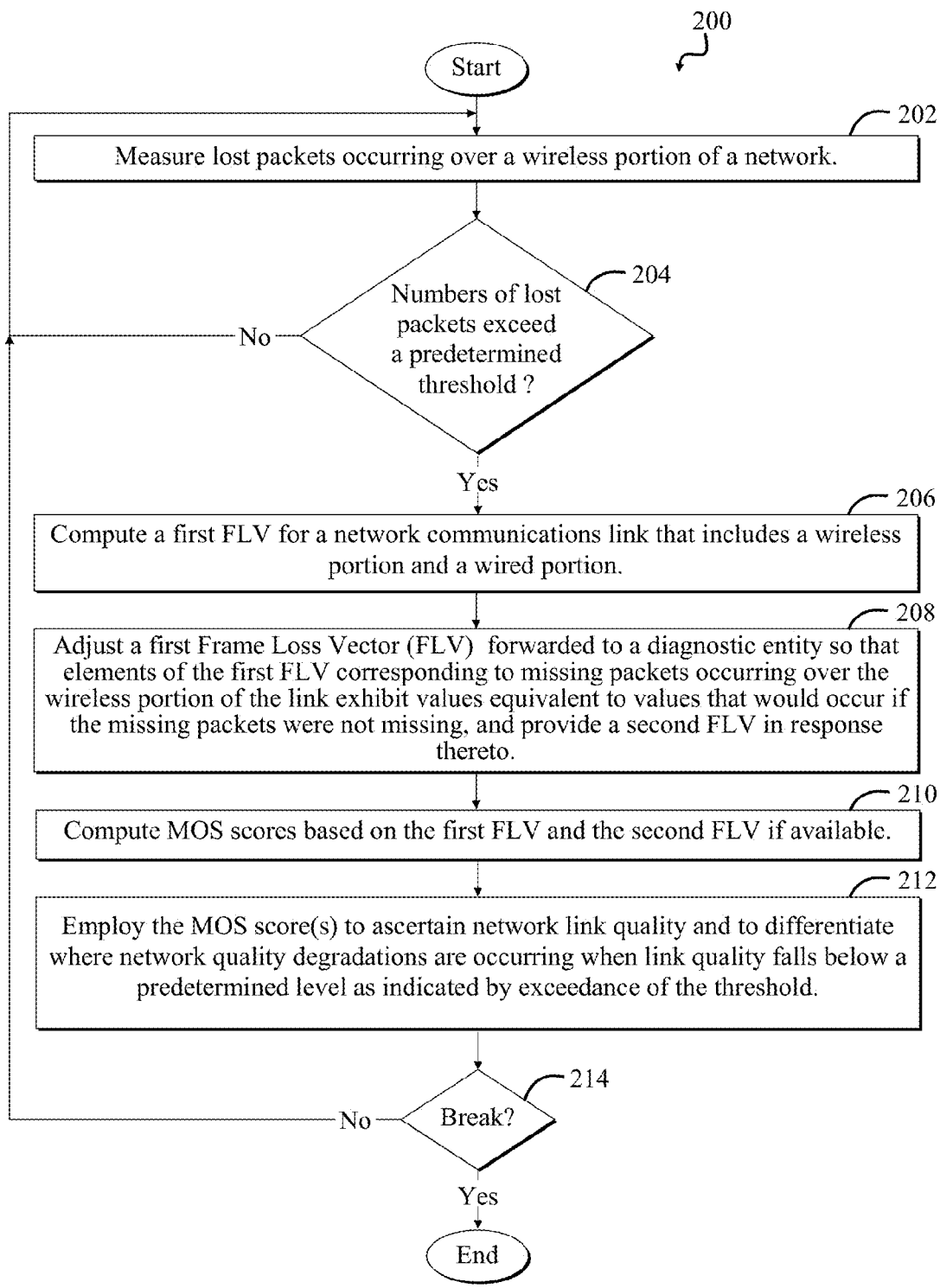
FIG. 7 is a flow diagram of a method adapted for use with the system of FIG. 6.

FIG. 7 is a flow diagram of a method 200 adapted for use with the system 150 of FIG. 6. With reference to FIGS. 6 and 7, the method 200 includes an initial lost-packet-measuring step 202. The lost-packet-measuring step 202 involves measuring lost packets occurring over the wireless portion 154 of the network 152.

In a subsequent threshold-checking step 204, the threshold detector 176 determines if the number of lost packets occurring in anywhere in the link between the VOIP phones 126, 160 reaches a predetermined reporting threshold within a predetermined time interval. If the numbers of lost packets over the network 152 have not passed the threshold or the performance has not dropped below another type of predetermined performance threshold, then the lost-packet-measuring step 202 continues. Otherwise, a first FLV step 206 is performed next.

In the first FLV step 206, a first FLV is computed for the entire communications link from the wired VOIP phone 26 to the wireless VOIP phone 160. In this FLV (FLV1), elements of the FLV corresponding to packets lost in the wireless portion 154 or the wired portion 156 of the network 152 are assigned 0s or other values indicative of lost packets.

In a subsequent second FLV step 208, a second FLV (FLV2) is computed, wherein elements of the FLV (FLV2) corresponding to missing packets occurring over the wireless portion 154 of the link between the VOIP phones 26, 160, are assigned 1s. The second FLV is representative of the performance of the wired portion 156 of the network 152.

Subsequently, MOS scores are computed based on FLV1 and FLV2 by the MOS computer 46 in a MOS-computation step 210. Steps 206-210 represent a type of selective lost-packet reporting.

In a subsequent analysis step 212, software and/or hardware running on the remote diagnostic system 44 employs the MOS scores to ascertain the quality of the link between the wired VOIP phone 26 and the wireless VOIP phone 160. Furthermore, the MOS scores are employed to determine where in the overall link quality degradations are occurring. For example, if FLV1 is significantly worse than FLV2, then the wireless link 170 is experiencing significant quality degradations. If FLV2 is low, then the wired portion 156 of the network 152 is compromised.

A subsequent break-checking step 214 determines if a system break has occurred, in which case, the method 200 completes. Otherwise, the lost-packet-measuring step 202 resumes.

Various embodiments of FIGS. 1-7 may be selectively combined without departing from the scope of the present invention.

Methodologies disclosed herein may allow various types of networks and accompanying diagnostic systems to more readily determine in which portions of a network performance degradation is occurring. Such portions need not be limited to wireless and wired portions of a network. However, preferably, such sections are separated by a common point or location, such as a router or access point, through which communications flow.

While the present embodiment is discussed with reference to systems and methods for facilitating diagnosis of VOIP networks and associated communications links, embodiments of the present invention are not limited thereto. For example, many types of networks, either wired or wireless or combinations thereof, may benefit systems constructed according to embodiment of the present invention. Any acceptable architecture, topology, protocols, or other network and digital processing features can be employed. In general, soft switches, routers, access points, clients, and so on, can be implemented via any device with processing ability or other requisite functionality. Examples of other applicable networks include cellular networks and Asynchronous Transfer Mode (ATM) networks.

Although processes of the present invention and the hardware executing the processes may be characterized by language common to a discussion of the Internet (e.g., "client," "server," "peer"), it should be apparent that operations of the present invention can execute on any type of suitable hardware in any communication relationship to another device on any type of link or network.

Although a process of the present invention may be presented as a single entity, such as software executing on a single machine, such software can readily be executed on multiple machines. That is, there may be multiple instances of a given software program, a single program may be executing on two or more processors in a distributed processing environment, parts of a single program may be executing on different physical machines, etc. Furthermore, two different programs, such as a client and server program, can be executing in a single machine, or in different machines. A single program can be operating as a client for one information transaction and as a server for a different information transaction.

Any type of processing device can be used as a client. For example, portable computing devices such as a personal digital assistant (PDA), cell phone, laptop computer, or other devices can be employed. In general, the devices and manner of specific processing (including location and timing) are not critical to practicing important features of the present invention.

Although the invention has been discussed with respect to specific embodiments thereof, these embodiments are merely illustrative, and not restrictive, of the invention. Embodiments of the present invention can operate between any two processes or entities including users, devices, functional systems, or combinations of hardware and software. Peer-to-peer networks and any other networks or systems where the roles of client and server are switched, change dynamically, or are not even present are within the scope of the invention.

Any suitable programming language can be used to implement the routines or other instructions employed by various network entities. Exemplary programming languages include C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "machine-readable medium" or "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. A computer may be any processor in communication with a memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented in whole or in part by using one or more programmed general purpose digital computers; by using application specific integrated circuits, programmable logic devices, field programmable gate arrays, optical, chemical, biological, quantum or nanoengineered systems or mechanisms; and so on. In general, the functions of the present invention can be achieved by any means as is known in the art. Distributed or networked systems, components, and/or circuits can be used. Communication, or transfer of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow "a", "an", and "the" include plural references unless the context clearly dictates otherwise. Furthermore, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A system comprising:
a first module including a first processor, the first module being configured to perform operations comprising:
receiving a data stream including packets from a first section of a network;
determining information associated with a quantity of packet loss in the data stream occurring in the first section of the network;
modifying the data stream by selectively inserting substitute packets in place of packets that were lost in the data stream in the first section of the network, wherein the substitute packets exhibit time stamps similar to time stamps associated with the packets that were lost; and
providing the modified data stream to a second module in a second section of the network, the modified data stream including at least one substitute packet;
the second module including a second processor, the second module being configured to perform operations comprising:
receiving the modified data stream from the first module;
determining a number of lost packets in the modified data stream over the second section of the network;
determining whether the number of lost packets exceeds a predetermined threshold value;
based on determining that the number of lost packets exceed the predetermined threshold value;
determining a first parameter that is indicative of packets lost over the first section and the second section of the network;
determining a second parameter that is indicative of packets lost over the first section of the network; and
providing the first parameter and the second parameter to a third module in the system; and
the third module including a third processor, the third module being configured to perform operations comprising:
receiving the first parameter and the second parameter from the second module;
determining, using the first parameter and the second parameter, a plurality of quality scores indicative of link qualities associated with the first section of the network, the second section of the network, and another section of the network; and
sending a message to the second module to modify the predetermined threshold value.

2. The system of claim 1, wherein sending a message to the second module to modify the predetermined threshold value further comprises:
determining, based on the first parameter and the second parameter, a quality of an overall communications link associated with the first section and the second section of the network; and
based on determining the quality of the overall communications link, sending the message to the second module to modify the predetermined threshold.

3. The system of claim 1, wherein the first section of the network is a wired network and the second section of the network is a wireless network.

4. The system of claim 1, wherein the first parameter includes a frame loss vector (FLV) associated with a communications link that traverses associated with a communications link that traverses a respective section of the network, and
wherein an FLV is a vector including values indicating received packets and lost packets in a pre-determined time interval corresponding to a length of the FLV.

5. The system of claim 1, wherein the second parameter includes an FLV associated with a communications link that traverses the first section of the network.

6. A method comprising:
receiving a data stream from network device over a first section of a network, wherein the data is received at the network device from a Voice over Internet Protocol (VoIP) device over a second section of the network;
determining a number of lost packets in the data stream over the first section of the network;
determining whether the number of lost packets exceeds a predetermined threshold value within a given time interval;
based on determining that the number of lost packets exceed the predetermined threshold value within the given time interval:
determining a first parameter that is indicative of packets lost over the first section and the second section of the network;
determining a second parameter that is indicative of packets lost over the first section of the network;
assigning, to certain elements of the second parameter, a value indicating packets are not lost, wherein the certain elements of the second parameter are associated with packets that are lost in the second section of the network; and
providing the first parameter and the second parameter to a remote diagnostic system.

7. The method of claim 6, further comprising:
computing, based on the first parameter and the second parameter, a plurality of mean opinion scores (MOS) for the first section of the network, the second section of the network and another section of the network;
determining, using the computed MOS scores, a quality of a communications link associated with each of the first section of the network, the second section of the network and the other section of the network; and
analyzing, based on determining the quality of the communications link, in which section of the network link quality degradations are occurring.

8. The method of claim 6, wherein the first section of the network is a wireless network and the second section of the network is a wired network.

9. The method of claim 6, wherein each of the first parameter and the second parameter is a frame loss vector (FLV) associated with a communications link that traverses a respective section of the network, and wherein an FLV is a vector including values indicating received packets and lost packets in a pre-determined time interval corresponding to a length of the FLV.

10. A computer-program product including a non-transitory machine-readable medium comprising instructions that when executed by a processor cause the processor to perform operations including:
receiving a data stream from a network device over a first section of a network, wherein the data is received at the network device from a Voice over Internet Protocol (VoIP) device over a second section of the network;

determining a number of lost packets in the data stream over the first section of the network;

determining whether the number of lost packets exceeds a predetermined threshold value within a given time interval;

based on determining that the number of lost packets exceed the predetermined threshold value within the given time interval:

determining a first parameter that is indicative of packets lost over the first section and the second section of the network;

determining a second parameter that is indicative of packets lost over the first section of the network; and providing the first parameter and the second parameter to a remote diagnostic system, wherein each of the first parameter and the second parameter is a frame loss vector (FLV) associated with a communications link that traverses a respective section of the network, and wherein an FLV is a vector including values indicating received packets and lost packets in a pre-determined time interval corresponding to a length of the FLV.

11. A method comprising:

receiving a data stream including packets from a sender device in a first section of a network;

observing skipped time stamps in a sequence of time stamps associated with a sequence of packets in the data stream;

observing packets in the data stream that are arriving outside of a pre-determined jitter buffer interval;

determining packets associated with the skipped time stamps and packets that are arriving outside of the pre-determined jitter buffer interval, as lost packets;

computing a first parameter for the data stream, wherein the first parameter is indicative of the lost packets in the first section of the network;

sending the first parameter to a remote diagnostic system;

modifying the data stream by replacing lost packets with substitute packets; and sending the modified data stream to a receiver device in a second section of the network.

12. The method of claim 11, wherein a substitute packet includes concealment information to minimize degradations in perceived audio quality experienced by a user of the receiver device.

13. The method of claim 11, wherein each of the sender device and the receiver device is associated with a VoIP phone.

14. The method of claim 11, wherein the first section of the network is a wireless network, and the second section of the network is a wired network.

15. The method of claim 11, further comprising:

receiving, at the receiver device, packets associated with the modified data stream;

assembling, using the receiver device, the modified data stream using the received packets;

generating, using the receiver device, a second parameter that is indicative of lost packets in the second section of the network; and sending, using the receiver device, the second parameter to the remote diagnostic system.

16. The method of claim 15, further comprising:

receiving, at a MOS computer associated with the remote diagnostic system, the first parameter and the second parameter;

computing, using the MOS computer and based on the first parameter, a first MOS score that is indicative of a communications link quality associated with the first section of the network;

computing, using the MOS computer and based on the second parameter, a second MOS score that is indicative of a communications link quality associated with the second section of the network; and combining, using the MOS computer, the first MOS score and the second MOS score to generate a third MOS score, wherein the third MOS score is indicative of a communications link quality associated with another section of the network.

17. The method of claim 16, wherein each of the first parameter and the second parameter is a frame loss vector (FLV) associated with a communications link that traverses a respective section of the network, and wherein an FLV is a vector including values indicating received packets and lost packets in a pre-determined time interval corresponding to a length of the FLV.

18. A system comprising:

a first module including a first processor, the first module being configured to perform operations comprising:

receiving a data stream comprising packets in a first section of a network;

observing skipped time stamps in a sequence of time stamps associated with a sequence of packets in the data stream;

observing packets in the data stream that are arriving outside of a pre-determined jitter buffer interval;

determining packets associated with the skipped time stamps and packets that are arriving outside of the pre-determined jitter buffer interval, as lost packets;

computing a first parameter for the data stream, wherein the first parameter is indicative of the lost packets in the first section of the network;

sending the first parameter to a third module;

modifying the data stream by replacing lost packets with substitute packets; and sending the modified data stream to a second module in a second section of the network;

the second module including a second processor, the second module being configured to perform operations comprising:

receiving, from the first module, packets associated with the modified data stream;

assembling the modified data stream using the received packets;

generating a second parameter that is indicative of lost packets in the second section of the network; and sending the second parameter to the third module; and the third module including a third processor, the third module being configured to perform operations comprising:

receiving, at a MOS computer associated with the third module, the first parameter from the first module and the second parameter from the second module;

computing, using the MOS computer and based on the first parameter, a first MOS score that is indicative of a communications link quality associated with the first section of the network;

computing, using the MOS computer and based on the second parameter, a second MOS score that is indicative of a communications link quality associated with the second section of the network; and combining, using the MOS computer, the first MOS score and the second MOS score to generate a third MOS score, wherein the third MOS score is indicative of a communications link quality associated with another section of the network.

19. A computer-program product including a non-transitory machine-readable medium comprising instructions that when executed by a processor cause the processor to perform operations including:

receiving a data stream including packets from a sender device in a first section of a network;

observing skipped time stamps in a sequence of time stamps associated with a sequence of packets in the data stream;

observing packets in the data stream that are arriving outside of a pre-determined jitter buffer interval;

determining packets associated with the skipped time stamps and packets that are arriving outside of the pre-determined jitter buffer interval, as lost packets;

computing a first parameter for the data stream, wherein the first parameter is indicative of the lost packets in the first section of the network;

sending the first parameter to a remote diagnostic system;

modifying the data stream by replacing lost packets with substitute packets; and sending the modified data stream to a receiver device in a second section of the network.

20. A method comprising:

receiving, at a receiver device, a data stream including packets that is sent from an AP device over a second section of a network, wherein the data stream is originated in a sender device in a first section of the network;

determining whether packets are lost in the data stream;

analyzing the received packets to determine whether substitute packets are present in the data stream;

based on determining that substitute packets are present in the data stream:

generating a first parameter associated with a link quality in the first section of the network by treating the substitute packets as packets missing in the first section of the network and treating lost packets as being present in the data stream;

generating a second parameter associated with a link quality in the second section of the network by treating the substitute packets as present in the data stream and treating lost packets as missing; and sending the first parameter and the second parameter to a remote diagnostic system, wherein each of the first parameter and the second parameter is a frame loss vector (FLV) associated with a communications link that traverses a respective section of the network, and wherein an FLV is a vector including values indicating received packets and lost packets in a pre-determined time interval corresponding to a length of the FLV.

21. The method of claim 20, wherein the first section of the network is a wireless network, and the second section of the network is a wired network.

22. The method of claim 20, wherein the first parameter and the second parameter are used for computing communications link qualities associated with the first section of the network, the second section of the network, and another section of the network.

23. A system comprising:

a first module including a first processor, the first module being configured to perform operations comprising:

receiving a data stream comprising packets in a first section of a network;

observing skipped time stamps in a sequence of time stamps associated with a sequence of packets in the data stream;

observing packets in the data stream that are arriving outside of a pre-determined jitter buffer interval;

determining packets associated with the skipped time stamps and packets that are arriving outside of the pre-determined jitter buffer interval, as lost packets;

modifying the data stream by replacing lost packets with substitute packets; and sending the modified data stream to a second module in a second section of the network;

the second module including a second processor, the second module being configured to perform operations comprising:

receiving the modified data stream from the first module over the second section of the network;

determining whether packets are lost in the modified data stream;

analyzing the received packets to determine whether substitute packets are present in the modified data stream;

based on determining that substitute packets are present in the modified data stream:

generating a first parameter associated with a link quality in the first section of the network by treating the substitute packets as packets missing in the first section of the network and treating lost packets as being present in the modified data stream;

generating a second parameter associated with a link quality in the second section of the network by treating the substitute packets as present in the modified data stream and treating lost packets as missing; and sending the first parameter and the second parameter to a third module; and the third module including a third processor, the third module being configured to perform operations comprising:

receiving, at a MOS computer associated with the third module, the first parameter and the second parameter from the second module;

computing, using the MOS computer and based on the first parameter, a first MOS score that is indicative of a communications link quality associated with the first section of the network;

computing, using the MOS computer and based on the second parameter, a second MOS score that is indicative of a communications link quality associated with the second section of the network; and combining, using the MOS computer, the first MOS score and the second MOS score to generate a third MOS score, wherein the third MOS score is indicative of a communications link quality associated with another section of the network.

24. A computer-program product including a non-transitory machine-readable medium comprising instructions that when executed by a processor cause the processor to perform operations including:

receiving, at a receiver device, a data stream including packets that is sent from an AP device over a second section of a network, wherein the data stream is originated in a sender device in a first section of the network;

determining whether packets are lost in the data stream;
analyzing the received packets to determine whether substitute packets are present in the data stream;
based on determining that substitute packets are present in the data stream:
  generating a first parameter associated with a link quality in the first section of the network by treating the substitute packets as packets missing in the first section of the network and treating lost packets as being present in the data stream;
  generating a second parameter associated with a link quality in the second section of the network by treating the substitute packets as present in the data stream and treating lost packets as missing; and
  sending the first parameter and the second parameter to a remote diagnostic system,
  wherein each of the first parameter and the second parameter is a frame loss vector (FLV) associated with a communications link that traverses a respective section of the network, and wherein an FLV is a vector including values indicating received packets and lost packets in a pre-determined time interval corresponding to a length of the FLV.

* * * * *